(12) United States Patent
Zhu et al.

(10) Patent No.: US 10,017,911 B2
(45) Date of Patent: Jul. 10, 2018

(54) MUNICIPAL SOLID WASTE LANDFILL BARRIER SYSTEM CAPABLE OF PROLONGING BREAKTHROUGH TIME OF LEACHATE AND MANUFACTURING METHOD THEREOF

(71) Applicant: HOHAI UNIVERSITY, Jiangsu (CN)

(72) Inventors: Wei Zhu, Jiangsu (CN); Shi Shu, Jiangsu (CN); Shengwei Wang, Jiangsu (CN); Haoqing Xu, Jiangsu (CN); Xihui Fan, Jiangsu (CN); Jianping Bao, Jiangsu (CN); Fanlu Min, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 0 days.

(21) Appl. No.: 15/548,416

(22) PCT Filed: Jan. 4, 2016

(86) PCT No.: PCT/CN2016/070033
§ 371 (c)(1),
(2) Date: Aug. 3, 2017

(87) PCT Pub. No.: WO2016/201958
PCT Pub. Date: Dec. 22, 2016

(65) Prior Publication Data
US 2018/0016766 A1    Jan. 18, 2018

(30) Foreign Application Priority Data

Jun. 16, 2015    (CN) .......................... 2015 1 0332514

(51) Int. Cl.
*B09B 1/00*    (2006.01)
*E02D 31/00*    (2006.01)

(52) U.S. Cl.
CPC .............. *E02D 31/004* (2013.01); *B09B 1/00* (2013.01); *E02D 31/00* (2013.01);
(Continued)

(58) Field of Classification Search
CPC ...................................................... B09B 1/004
(Continued)

(56) References Cited

U.S. PATENT DOCUMENTS 5,190,406 A * 3/1993 Shannonhouse .......... B09B 1/00
405/129.6

FOREIGN PATENT DOCUMENTS

CN    1449873    10/2003
CN    1557577    12/2004
(Continued)

OTHER PUBLICATIONS

"International Search Report (Form PCT/ISA/210)", dated Apr. 7, 2016, with English translation thereof, pp. 1-4.

*Primary Examiner* — Sean D Andrish
(74) *Attorney, Agent, or Firm* — JCIPRNET

(57) ABSTRACT

The invention relates to a MSW (municipal solid waste) landfill barrier system capable of prolonging breakthrough time of leachate and a manufacturing method thereof. The system comprises a leachate collection and removal layer, a first HDPE (high-density polyethylene) geomembrane infiltration proof layer (2), a clay liner (5) and a groundwater collection and removal layer (6) which are sequentially stacked from top to bottom. The clay liner (5) is composed of a lower clay liner (51), a middle clay liner (52) and an upper clay liner (53) which are sequentially arranged, wherein the middle clay liner (52) is filled with a medium-fine sand layer (7) laid with sands of particle sizes ranging from 0.1 mm to 0.5 mm and of water content ≤3%, wherein the saturated hydraulic conductivity of the medium-fine sand
(Continued)

layer (7) varies from $1\times10^{-5}$ to $1\times10^{-3}$. A method of manufacturing the MSW landfill barrier system capable of prolonging breakthrough time of leachate is also provided.

12 Claims, 1 Drawing Sheet

(52) U.S. Cl.
CPC ........... *E02D 2250/0023* (2013.01); *E02D 2300/0015* (2013.01); *E02D 2300/0037* (2013.01); *E02D 2300/0079* (2013.01)

(58) Field of Classification Search
USPC ..... 405/129.45, 129.5, 129.6, 129.7, 129.75, 405/129.95
See application file for complete search history.

(56) References Cited

FOREIGN PATENT DOCUMENTS

| | | | |
|---|---|---|---|
| CN | 101967835 | | 2/2011 |
| CN | 104863184 | | 8/2015 |
| DE | 3540715 | * | 5/1987 |
| DE | 4009387 | | 10/1991 |
| JP | H10211482 | | 8/1998 |

* cited by examiner

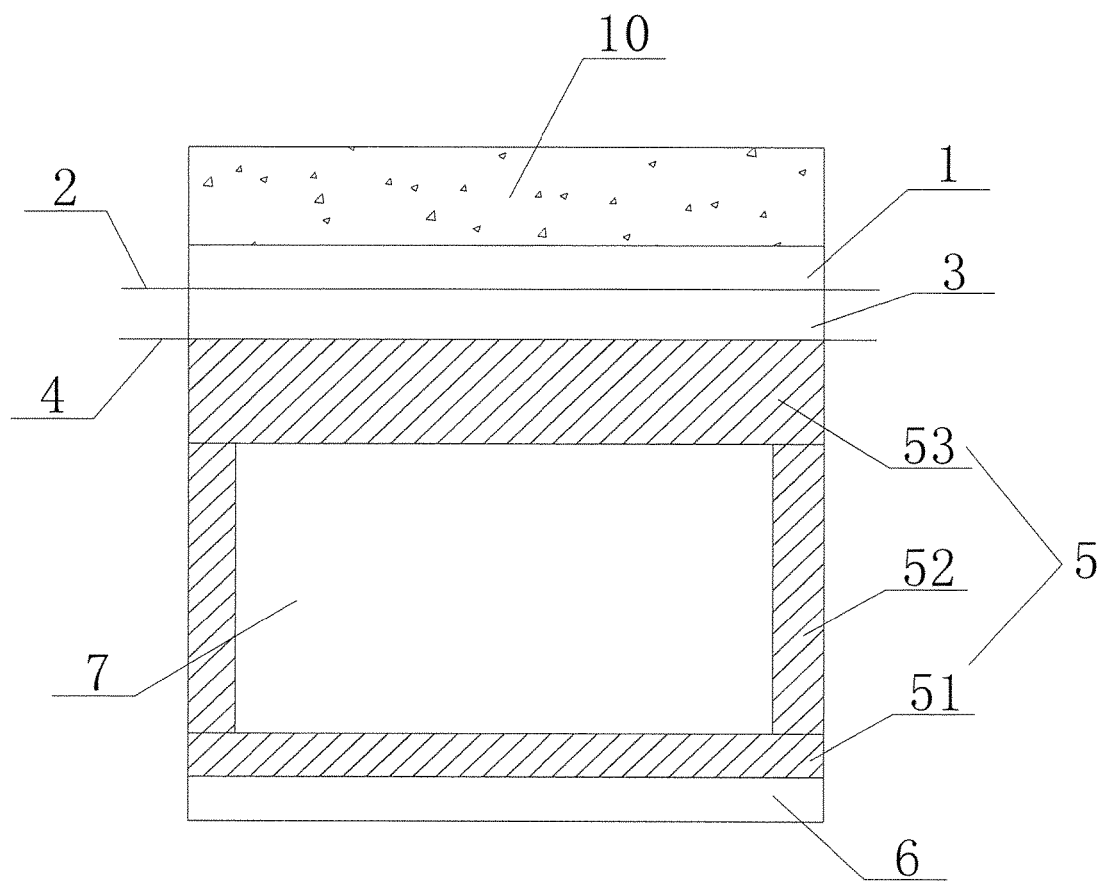

MUNICIPAL SOLID WASTE LANDFILL BARRIER SYSTEM CAPABLE OF PROLONGING BREAKTHROUGH TIME OF LEACHATE AND MANUFACTURING METHOD THEREOF

CROSS-REFERENCE TO RELATED APPLICATION

This application is a 371 of international application of PCT application serial no. PCT/CN2016/070033, filed on Jan. 4, 2016, which claims the priority benefit of China application no. 201510332514.1, filed on Jun. 16, 2015. The entirety of each of the above-mentioned patent applications is hereby incorporated by reference herein and made a part if this specification.

BACKGROUND OF THE INVENTION

1. Field of the Invention

The present invention falls within the field of municipal solid waste (MSW) landfill barrier systems. It relates to a MSW landfill barrier system, and in particular, to a MSW landfill barrier system capable of prolonging breakthrough time of leachate and a manufacturing method thereof.

2. Description of Related Art

The production of municipal solid waste (MSW) rapidly increases with the progressive urbanization and continuous improvement of people's living standards in China. Nowadays, the annual production volume of MSW in China has been 240 million tons and is still rapidly increasing at a rate of 8% to 15% each year, topping the world in either the production volume or the increasing rate thereof. Large amounts of solid waste directly damage urban security and stability. MSW landfills, with low technology doorsill and large disposal capacity, are the ultimate disposal means and currently one of the main measures for waste handling and disposal, accounting for 90.5% of the total disposal capacity.

The MSW in China contains high content of kitchen waste and high content of water, making it easy to produce high leachate head after dumping and accordingly easy to cause landslides which may damage the urban environment and menace citizens' lives and property. High leachate head may also destroy antifouling barriers and cause an early breakthrough of pollutants, resultantly polluting the surrounding environment of MSW landfills and groundwater. Once the underground environment has been destroyed, it will be tremendously difficult to restore it and bring about incalculable serious consequences.

For landfill barrier systems, the Ministry of Housing and Urban-Rural Development of People's Republic of China has issued "Household Waste Sanitary Landfill Barrier System Engineering Technical Specifications CJJ113-2007", providing that a double-layer liner structure shall be sequentially stacked from top to bottom as the follow: a leachate collection and removal layer, a main infiltration proof layer (containing liner materials and protective materials), a leakage detection layer, a sub infiltration proof layer (containing liner materials and protective materials), a liner foundation and a groundwater collection and removal layer. In the double-layer liner structure, it shall be able to timely detect the perviousness of the main infiltration proof layer by the leakage detection layer.

Currently, the two HDPE (high-density polyethylene) geomembrane layers, respectively located at top and bottom of the double-layer liner structure, tend to become aging and porous. Under a high leachate head, once the HDPE geomembrane has been destroyed or broken down by pollutants, the leachate will soon reach the lower compacted clay liner and breakthrough the compacted clay liner to seriously threaten the underground environment. There are two prior arts for preventing landfill leachate from breakthrough the barrier system. The first one is to modify the clay liner by mixing additives therein to enhance the clay intensity and improve the clay imperviousness. The second one is to lay geosynthetics and bagged soil protection layer on the basis of the HDPE geomembrane infiltration proof layer so as to enhance the protection of HDPE geomembrane. The first prior art involves complex operation to make it time consuming and labor intensive and thus is inaccessible to industrialization. The second prior art, though having enhanced the protection for HDPE geomembrane, is unable to improve the anti-seepage performance and yet also time consuming and labor intensive.

SUMMARY OF THE INVENTION

The object of the present invention is to provide a MSW landfill barrier system capable of prolonging breakthrough time of leachate and a manufacturing method thereof, so as to overcome the deficiencies of prior arts.

To achieve the above object, the present invention adopts the following technical solutions. A MSW landfill barrier system capable of prolonging breakthrough time of leachate comprises a leachate collection and removal layer, a first HDPE (high-density polyethylene) geomembrane infiltration proof layer, a clay liner and a groundwater collection and removal layer which are sequentially stacked from top to bottom. The clay liner comprises a lower clay liner, a middle clay liner and an upper clay liner which are sequentially arranged, wherein the middle clay liner is filled with a medium-fine sand layer laid with sands of particle sizes ranging from 0.1 mm to 0.5 mm and of water content ≤3%. The saturated hydraulic conductivity of the medium-fine sand layer varies from $1\times10^{-5}$ to $1\times10^{-3}$ cm/s.

Preferably, the height of the middle fine sand layer is ≥200 cm.

Preferably, the saturated hydraulic conductivity of the clay liner is ≤$1\times10^{-7}$ cm/s; the thicknesses of the middle clay liner is ≥30 cm; and the thicknesses of the lower clay liner is ≥30 cm.

Preferably, a leachate leakage detection layer is laid between the clay liner and the first HDPE geomembrane infiltration proof layer.

Further, a second HDPE geomembrane infiltration proof layer is laid between the leachate leakage detection layer and the clay liner.

The present invention also provides a manufacturing method of the MSW landfill barrier system capable of prolonging breakthrough time of leachate, the method comprising the following steps:

(a) drying sands until the water content thereof is ≤3%, and then screening out medium-fine sands of particle sizes ranging from 0.1 mm to 0.5 mm;

(b) digging a pit for dumping solid waste and laying the groundwater collection and removal layer (6) therein, then laying the compacted lower clay liner (51) on the groundwater collection and removal layer (6);

(c) laying medium-fine sands on the lower clay liner (51) to form the medium-fine sand layer (7); laying the compacted middle clay liner (52) around the medium-fine sand layer (7); then laying the compacted upper clay liner (53) on the medium-fine sand layer (7) and the middle clay liner (52);

(d) finally, on the top of the upper clay liner (53), sequentially laying the first HDPE geomembrane infiltration proof layer (2) and the leachate collection and removal layer (1) from bottom to top.

The above step (a) and step (b) are in no particular orders.

Preferably, in step (a), the drying process involves keeping the sands exposed to sunlight for 24 hours or placing the sands into a large-size oven and baking them at a temperature of 105-110° C. to a constant weight.

Preferably, in step (d), sequentially laying the second HDPE geomembrane infiltration proof layer (4) and the leachate leakage detection layer (3) prior to laying the first HDPE geomembrane infiltration proof layer (2).

With the application of the above technical solutions, the present invention, compared to prior art, has the following advantages. By filling the middle clay liner with a medium-fine sand layer with the saturated hydraulic conductivity varying from $1 \times 10^{-5}$ to $1 \times 10^{-3}$ cm/s and laid with sands of particle sizes ranging from 0.1 mm to 0.5 mm and of water content ≤3%, the current MSW landfill barrier system capable of prolonging breakthrough time of leachate is able to show unexpected effects of tremendously prolonging the breakthrough time of leachate and increasing anti-seepage performance of the MSW landfill infiltration proof layer. Moreover, the medium-fine sands are low in cost and readily available as sands stockyards widely spread in China. The current MSW landfill barrier system has a simple structure and is able to effectively prevent the groundwater from permeating into and saturating the medium-fine sand layer, so that the medium-fine sand layer is kept in an unsaturated state all the time.

BRIEF DESCRIPTION OF THE DRAWINGS

FIG. 1 is a structural schematic diagram of the MSW landfill barrier system capable of prolonging breakthrough time of leachate of this invention;

wherein 1: a leachate collection and removal layer; 2: a first HDPE geomembrane infiltration proof layer; 3: a leachate leakage detection layer; 4: a second HDPE geomembrane infiltration proof layer; 5: a clay liner; 51: a lower clay liner; 52: a middle clay liner; 53: an upper clay liner; 6: a groundwater collection and removal layer; 7: a medium-fine sand layer; 10: solid waste.

DESCRIPTION OF THE EMBODIMENTS

Hereafter, preferable embodiments of the present invention will be described in combination with the accompany drawings.

As shown in FIG. 1, the MSW landfill barrier system capable of prolonging breakthrough time of leachate from top to bottom sequentially comprises a leachate collection and removal layer 1, a first HDPE geomembrane infiltration proof layer 2, a clay liner 5 and a groundwater collection and removal layer 6;

Wherein, the clay liner 5 comprises a lower clay liner 51, a middle clay liner 52 and an upper clay liner 53 which are sequentially arranged. The middle clay liner is filled with a medium-fine sand layer 7 laid with sands of particle sizes ranging from 0.1 mm to 0.5 mm and of water content ≤3%, so that the saturated hydraulic conductivity of the medium-fine sand layer varies from $1 \times 10^{-5}$ to $1 \times 10^{-3}$ cm/s. The current MSW landfill barrier system has unexpected effects. Though with a simple structure, the system is able to greatly prolong the breakthrough time of leachate and to increase the anti-seepage performance of the landfill infiltration proof layer. Further, the system is low in cost and readily available as sands stockyards widely spread in China. The system does not require use of chemicals, preventing the surrounding environment from secondary pollution so as to benefit the environment. The division of the clay liner 5 into three parts can effectively prevent groundwater from infiltrating into and saturating the medium-fine sand layer 7, so as to keep the medium-fine sand layer in an unsaturated state all the time.

In the present embodiment, the height of the medium-fine sand layer 7 is preferably ≥200 cm to further prolong the breakthrough time of leachate. The saturated hydraulic conductivity of the clay liner 5 is ≤$1 \times 10^{-7}$ cm/s, the thickness of the middle clay liner 52 is ≥30 cm, and the height of the lower clay liner 51 is ≥30 cm, so as to further prevent groundwater from invading the medium-fine sand layer 7. A leachate leakage detection layer 3 is laid between the clay liner 5 and the first HDPE geomembrane infiltration proof layer 2; and a second HDPE geomembrane infiltration proof layer 4 is laid between the leachate leakage detection layer 3 and the clay liner 5, so as to increase the imperviousness of the landfill barrier system.

A manufacturing method for the above MSW landfill barrier system capable of prolonging breakthrough time of leachate, comprising the following steps:

(a) drying sands until the water content thereof is ≤3%, and then screening out medium-fine sands of particles sizes ranging from 0.1 mm to 0.5 mm, wherein the drying process involves keeping the sands exposed to sunlight for 24 hours or placing the sands into a large-size oven and baking them at a temperature of 105-110° C. for at least 6 hours to a constant weight, wherein the water content of sands is measured by randomly selecting 3 sand samples per 10 m³ for sampling, and measuring the water content in accordance with the requirements of China's "Standards for Geotechnical Test Method" BG/T50123-1999.

(b) digging a pit on the solid waste dumping ground and laying the groundwater collection and removal layer 6 therein, then laying the compacted lower clay liner 51 on the groundwater collection and removal layer 6;

(c) laying medium-fine sands in the lower clay liner 51 and compacting the sands to form the medium-fine sand layer 7; next, laying the compacted middle clay liner 52 around the medium-fine sand layer 7; then laying the compacted upper clay liner 53 on the medium-fine sand layer 7 and the middle clay liner 52;

(d) sequentially laying the HDPE geomembrane infiltration proof layer 4, the leachate leakage detection layer 3, the first HDPE geomembrane infiltration proof layer 2 and the leachate collection and removal layer 1, from bottom to top, on the upper clay liner 53.

The above step (a) and step (b) are in no particular orders. Construction should be conducted on clear days. As soon as the laying of the medium-fine sand layer 7 is completed, the clay liner 5 should be laid and compacted thereon to prevent the medium-fine sand layer 7 from absorbing water in the process of construction, causing an increase of water content.

The above embodiment is only to illustrate the technical idea and features of the present invention, aiming to teach persons skilled in the art about the content of the present invention so as to enable them to practice it, yet not to limit the scope of the claimed invention. It will be understood that any equivalent alteration or modification made without departing from the principles of the present invention shall fall within the scope of the claimed invention.

What is claimed is:

1. A municipal solid waste landfill barrier system capable of prolonging breakthrough time of leachate, comprising:
   a groundwater collection and removal layer in a pit;
   a medium-fine sand layer on the groundwater collection and removal layer, wherein a particle size of sands in the medium-fine sand layer is 0.1 mm to 0.5 mm and water content of the medium-fine sand layer is ≤3%, so that a saturated hydraulic conductivity of the medium-fine sand layer is from $1\times10^{-5}$ to $1\times10^{-3}$ cm/s;
   a clay liner on the groundwater collection and removal layer and surrounding all surfaces of the medium-fine sand layer, wherein the clay liner comprises:
      a lower clay liner disposed between the groundwater collection and removal layer and the medium-fine sand layer;
      a middle clay liner surrounding lateral surfaces of the medium-fine sand layer and on the lower clay liner; and
      an upper clay liner on the medium-fine sand layer and the middle clay liner;
   a first HDPE (high-density polyethylene) geomembrane infiltration proof layer on the clay liner; and
   a leachate collection and removal layer on the first HDPE geomembrane infiltration proof layer.

2. The municipal solid waste landfill barrier system of claim 1, wherein a height of the medium-fine sand layer is ≥200 cm.

3. The municipal solid waste landfill barrier system of claim 2, wherein the middle clay liner has a thickness of ≥30 cm, and the lower clay liner has a height of ≥30 cm, so that the saturated hydraulic conductivity of the clay liner is ≤$1\times10^{-7}$ cm/s.

4. The municipal solid waste landfill barrier system of claim 1, further comprising a leachate leakage detection layer laid between the clay liner and the first HDPE geomembrane infiltration proof layer.

5. The municipal solid waste landfill barrier system of claim 4, further comprising a second HDPE geomembrane infiltration proof layer laid between the leachate leakage detection layer and the clay liner.

6. A method for manufacturing the municipal solid waste landfill system capable of prolonging breakthrough time of leachate of claim 1, comprising:
   drying the sands until water content thereof is ≤3%;
   screening out medium-fine sands of particle sizes ranging from 0.1 mm to 0.5 mm from the dried sands;
   digging the pit on a solid waste dumping ground;
   laying the underground water collection and removal layer in the pit;
   laying the lower clay liner on the underground water collection and removal layer;
   laying medium-fine sands on the lower clay liner;
   compacting the medium-fine sands to form the medium-fine sand layer;
   laying the middle clay liner to surround lateral surfaces of the medium-fine sand layer;
   laying the upper clay liner on the medium-fine sand layer and the middle clay liner;
   laying the first HDPE geomembrane infiltration proof layer on the upper lay layer; and
   laying the leachate collection and removal layer on the first HDPE geomembrane infiltration proof layer.

7. The method of claim 6, wherein the drying step comprises:
   keeping the sands exposed to sunlight for 24 hours.

8. The method of claim 6, wherein the drying step comprises:
   placing the sands into a large-size oven and baking the sands at a temperature of 105-110° C. to a constant weight.

9. The method of claim 6, further comprising:
   laying the leachate leakage detection layer between the clay liner and the first HDPE geomembrane infiltration proof layer.

10. The method of claim 9, further comprising:
    laying the second HDPE geomembrane infiltration proof layer between the leachate leakage detection layer and the clay liner.

11. The method of claim 6, wherein a height of the medium-fine sand layer is ≥200 cm.

12. The method of claim 11, wherein the middle clay liner has a thickness of ≥30 cm, and the lower clay liner has a height of ≥30 cm, so that the saturated hydraulic conductivity of the clay liner is ≤$1\times10^{-7}$ cm/s.

* * * * *